United States Patent
Pelka

(10) Patent No.: US 11,273,789 B2
(45) Date of Patent: Mar. 15, 2022

(54) RESTRAINT SYSTEM FOR A VEHICLE SEAT

(71) Applicant: GRAMMER AG, Amberg (DE)

(72) Inventor: Joachim Pelka, Amberg (DE)

(73) Assignee: Grammer AG, Ursensollen (DE)

( * ) Notice: Subject to any disclaimer, the term of this patent is extended or adjusted under 35 U.S.C. 154(b) by 84 days.

(21) Appl. No.: 16/802,793

(22) Filed: Feb. 27, 2020

(65) Prior Publication Data

US 2020/0269803 A1 Aug. 27, 2020

(30) Foreign Application Priority Data

Feb. 27, 2019 (DE) .......................... 102019104923.7

(51) Int. Cl.
*B60R 22/20* (2006.01)
*B60R 22/26* (2006.01)
*B60R 22/18* (2006.01)

(52) U.S. Cl.
CPC ............ *B60R 22/201* (2013.01); *B60R 22/26* (2013.01); *B60R 2022/1825* (2013.01); *B60R 2022/1831* (2013.01)

(58) Field of Classification Search
CPC ....... B60R 22/20; B60R 22/201; B60R 22/26; B60R 2022/1818; B60R 2022/1825; B60R 2022/1831; B60R 2022/207; B60N 2/688

See application file for complete search history.

(56) References Cited

U.S. PATENT DOCUMENTS

| 4,884,825 A | * | 12/1989 | Grunewald ........... B60R 22/205 |
| | | | 280/806 |
| 5,102,166 A | * | 4/1992 | Bogner ................. B60R 22/201 |
| | | | 280/801.2 |
| 5,358,310 A | | 10/1994 | Nemoto |
| 5,411,292 A | * | 5/1995 | Collins ............... B60R 22/1855 |
| | | | 280/806 |

(Continued)

FOREIGN PATENT DOCUMENTS

| CN | 108045341 A | * | 5/2018 | |
| DE | 2720789 A1 | * | 11/1978 | ........... B60R 22/201 |

(Continued)

OTHER PUBLICATIONS

Official Action for German Patent Application No. 102019104923.7, dated Nov. 21, 2019, 3 pages.

(Continued)

*Primary Examiner* — James A English
*Assistant Examiner* — Scott F. Underwood
(74) *Attorney, Agent, or Firm* — Sheridan Ross P.C.

(57) ABSTRACT

The invention relates to a restraint system for a vehicle seat, comprising a webbing belt element for restraining an occupant of the vehicle seat, further comprising a guide belt element which is guided continuously on a guideway, the holding element being securely connected to a first section of the guide belt element, wherein the webbing belt element is passed through a cutout of the holding element, wherein by means of a movement of the self-contained guide belt element on the guideway in a first direction of rotation the holding element is continuously adjustable within an adjustment section of the guideway from a second maximum position to a first maximum position.

15 Claims, 5 Drawing Sheets

(56) References Cited

U.S. PATENT DOCUMENTS

| | | | | |
|---|---|---|---|---|
| 7,350,734 B2* | 4/2008 | Stevens | ............... | B60R 22/1955 |
| | | | | 242/374 |
| 2011/0062765 A1* | 3/2011 | Ott | ......................... | B60R 22/26 |
| | | | | 297/468 |
| 2016/0121846 A1* | 5/2016 | Kujawa | ................. | B60R 22/195 |
| | | | | 280/801.1 |
| 2016/0137160 A1* | 5/2016 | Dingman | ............. | B60R 22/201 |
| | | | | 280/801.2 |
| 2019/0241152 A1* | 8/2019 | Ohno | ...................... | B60R 22/26 |

FOREIGN PATENT DOCUMENTS

| | | | | |
|---|---|---|---|---|
| DE | 3532407 A1 * | 3/1987 | ......... | B60R 22/4604 |
| DE | 9217847 | 2/1993 | | |
| DE | 19752059 | 5/1999 | | |
| DE | 102004038392 A1 * | 3/2006 | ........... | B60R 22/201 |
| DE | 102013019070 | 5/2015 | | |
| DE | 102014013080 | 3/2016 | | |
| WO | WO-2008098925 A1 * | 8/2008 | ............. | B60R 22/28 |
| WO | WO-2018167945 A1 * | 9/2018 | ............. | B60R 22/26 |

OTHER PUBLICATIONS

Official Action with Machine Translation for German Patent Application No. 102019104923.7, dated Oct. 14, 2020, 3 pages.

\* cited by examiner

RESTRAINT SYSTEM FOR A VEHICLE SEAT

CROSS-REFERENCE TO RELATED APPLICATIONS

This application claims the benefit of German Patent Application No. DE 10 2019 104 923.7 filed Feb. 27, 2019, the entire disclosure of which is incorporated herein by reference in its entirety.

FIELD

The invention relates to a restraint system for a vehicle seat according to the preamble of claim 1.

BACKGROUND

Generic restraint systems are arranged on many vehicle seats and are intended to restrain the occupants of an associated vehicle in the event of an accident, that is to say when there are sudden, severe decelerations, and thus to protect them from being thrown by or out of the vehicle. The restraint system comprises, for example, a webbing belt element, which is arranged, for example, as part of a 3-point belt system. This webbing belt element is in particular placed obliquely over the chest and abdomen area of the occupant and is deflected downward, for example, by means of a deflection device arranged above a shoulder area of the occupant. A buckle tongue element is slidably arranged on the webbing belt element. In the vehicle, for example at the level of a seat for the occupant, a belt buckle is also arranged, into which the buckle tongue can engage, thus ensuring a secure state of the occupant.

In order to ensure for occupants of different body sizes that the position of the deflection device is arranged just above the shoulder of the occupant, devices for individually adapting this position with respect to a height direction of the vehicle seat are known from the prior art. For example, a pin element of the deflection device can be moved to a desired position within a groove in the body.

SUMMARY

The object of the present invention is to improve the conventional restraint systems and in particular to increase the positional security of the deflection device.

The object of the present invention is achieved by a restraint system for a vehicle seat, comprising a webbing belt element for restraining an occupant of the vehicle seat, further comprising a guide belt element which is guided continuously on a guideway, the holding element being positionally secure connected to a first section of the guide belt element, wherein the webbing belt element is guided passing through a cutout of the holding element. According to the invention, it is provided that the guide belt element is self-contained, wherein the movement of the guide belt element on the guideway in a first direction of rotation allows the holding element to be continuously adjusted from a second to a first maximum position within an adjustment section of the guideway.

In the context of the present invention, a belt element (guide belt element or webbing belt element) should be understood as an element of which the length is greater than the width and the height and of which the width is greater than the height. While an open belt element has two ends in the longitudinal direction, a self-contained belt element forms a closed curve in the longitudinal direction and thus has a closed circumference. Examples of such belt elements are straps, conveyor belts, etc.

As described above, the guide belt element has a cross-section perpendicular to the first direction of rotation which is preferably designed in the form of a rectangle. A first length (corresponding to the width of the guide belt element) of the opposing first edges of the rectangle is preferably greater, more preferably substantially greater than a second length (corresponding to the height of the guide band element) of the opposing second edges of the rectangle. The second length can also be referred to as the height or thickness of the guide belt element. One of the first edges is preferably assigned in each case to the first side or the second side of the guide belt element. It can be assumed that the normal vector of the first side and the normal vector of the second side of the guide belt element are always configured perpendicular to the first direction of rotation.

It is preferably provided that all conceivable positions of the holding element which this element assumes with respect to a course of the guideway are arranged within the adjustment section. The holding element takes on the function of the support element of the webbing belt element. The webbing belt element is guided inside the cutout of the holding element, but is otherwise configured to be movable.

In the case of an adjustment as described above, the holding element preferably experiences only a translational movement and/or no rotational movement. The direction of rotation and/or the guide belt element is preferably designed to run in a straight line within the adjustment range.

The present invention thus ensures a continuous and low-play attachment of the restraint system to a seat by guiding the holding element by means of the circumferential guide belt element. It is therefore possible to mount the guide belt element in a far more secure manner, since its closed shape has two possible directions of rotation. The two directions of rotation are preferably opposite to each other. The second direction of rotation in relation to a course of the guideway preferably corresponds to the direction from the first maximum position to the second maximum position. Furthermore, the first direction of rotation in relation to a course of the guideway preferably corresponds to the direction from the second maximum position to the first maximum position. Movements of the guide belt element in one or the other direction can thus be controlled separately from one another.

Furthermore, the restraint system is easily attached to a seat with few components required, which minimises costs. It is ensured that the individually desired position of the holding element can be adjusted ergonomically and manually.

The guide belt element is, for example, a polyester belt and preferably has a low degree of stretchability. The holding element is securely mounted on the guide belt element; for example, the holding element is connected to one or two sides of the guide belt element by means of an adhesive connection. Alternatively or cumulatively, the holding element can comprise two parts, one of which is arranged on a first side of the guide belt element and the other on a second side of the guide belt element. For example, these two parts are connected to one another by means of a clip connection or a screw connection.

It is preferred that the guide belt element forms a constriction of its cross-section in the first section when the holding element is mounted. In other words, the guide belt element is preferably subjected to a force in the form of a surface pressure by means of the holding element.

The webbing belt element preferably also has a rectangular cross-section. The cutout in the holding element for the webbing belt element is preferably complementary to the cross-section of the webbing belt element and/or rectangular.

This principle of guiding a webbing belt element by means of a rotating guide belt element is new. A comparatively high stroke, that is to say a comparatively large distance, can be provided here between the two maximum positions of the holding element. For example, a stroke of 100 mm is possible here; values of only about 50 mm are known from the prior art.

In order to ensure that the desired position of the holding element is secured, it is provided according to an advantageous embodiment that the guideway forms a friction section which is arranged separately from the adjustment section. A braking unit for the guide belt element is preferably arranged in the friction section. For example, this braking unit comprises a friction wheel unit arranged on a first side of the guide belt element and a brake shoe unit arranged on a second side of the guide belt element and capable of interacting with the friction wheel unit.

The friction wheel unit advantageously forms a frictional contact with the first side of the guide belt element. The brake shoe unit advantageously forms a frictional contact with the second side of the guide belt element. The friction wheel unit and the brake shoe unit are advantageously located opposite one another in relation to the direction of rotation.

It is also advantageous if the friction wheel unit comprises a friction wheel element. The outer surface thereof preferably forms a friction surface with respect to the guide belt element. It is also advantageous if a rotational movement of the friction wheel element about a central axis of the friction wheel element is acted upon by a force in a first direction and forms a freewheel in a second direction.

The brake shoe unit advantageously has exactly one plane of mirror symmetry. A central axis of the friction wheel element advantageously lies in this mirror symmetry plane.

For example, the outer surface of the friction wheel element has a coating of a material which ensures a sufficiently high friction. For example, this material is a rubber material.

It is preferred that the first direction of the friction wheel element is in the same direction as the second direction of rotation of the guideway. It is also preferred that the second direction of the friction wheel element is in the same direction as the first direction of rotation of the guideway.

In the following, the assumption is that the first maximum position is arranged above the second maximum position in relation to a height direction of the restraint system. After a user has set a changed position of the holding element, which in the present case is not intended to represent the second maximum position, gravity acts on the holding element and tries to move it towards the second maximum position. This undesired movement is successfully prevented by the force applied to the guide belt element by means of the friction wheel element and the brake shoe unit. When the holding element is adjusted in the direction of the second maximum position, the friction surface of the friction wheel element and/or the brake shoe unit is advantageously designed in each case so that the applied frictional force can be overcome manually. In the opposite direction, that is, for example, when the holding element is to be moved upward, an almost force-free adjustment is possible.

In the event of a crash, that is to say, for example, in the event of a sudden deceleration of the vehicle, strong forces act on the webbing belt element, for example in one direction starting from the holding element and directed away from the friction section of the restraint system. This immediately overcomes the applied frictional force. The position of the holding element is changed until the second maximum position is reached. In other words, the lowest belt height is suddenly approached, for example. For example, the vehicle seat is designed such that the backrest is designed to be pivotable relative to the seat surface and that the two maximum positions of the holding element are arranged on an upper region of the backrest. In the event of a crash, the lever arm which the backrest represents in relation to a rotation about an axis between the backrest and the seat surface is advantageously shortened and the torque introduced into the seat axis is reduced. As a result, the back structure can be designed overall more cost-effectively.

In order to improve the interaction between the brake shoe unit and the friction wheel unit, it is advantageous if the brake shoe unit comprises a brake shoe element. This forms, for example, a cutout designed to be complementary to a section of the outer surface of the friction wheel element. For example, this cutout is curved at least in some sections.

It is therefore preferably ensured that at least part of the outer surface of the friction wheel element and at least part of a surface of the cutout in the brake shoe element form a section of the guideway for the guide belt element.

A surface of the brake shoe element preferably forms a friction surface with respect to the guide belt element. For example, the outer surface of the friction wheel element has a coating of a material which ensures a sufficiently high friction. For example, this material is a rubber material.

The brake shoe element is advantageously subjected to spring force in relation to a direction which is arranged parallel to the normal vector of the two sides of the guide belt element and which points towards the central axis of the friction wheel element. The brake shoe element thus ensures that the guide belt element is securely guided between the brake shoe element and the friction wheel element. The above-mentioned cutout also ensures, in interaction with the shape of the friction wheel element, a high degree of wrap of the guide belt element in relation to the outer surface of the friction wheel element and the surface of the cutout of the brake shoe element.

In order to ensure secure guidance of the webbing belt element, it is also advantageous if the guide belt element is guided passing through a cutout in the first section of the guide belt element. The cutout of the guide belt element and the cutout of the holding element, through which the guide belt element is also guided, are preferably arranged to overlap one another. Both cutouts are preferably of the same size and/or congruent to one another. In a fully assembled state of the restraint system, a degree of overlap between the two cutouts is preferably 100%.

It is further provided according to a preferred exemplary embodiment that a longitudinal extension of the cutout of the guide belt element and/or a longitudinal extension of the cutout of the holding element are arranged at an acute angle relative to the first direction of rotation. This arrangement of the cutout(s) has the advantage that the webbing belt element can be placed around the body of the seat occupant in an ergonomically favourable manner following the oblique cutout.

It is also advantageous if an extent of the holding element in a direction parallel to the first direction of rotation is greater on a first side than on a second side. The asymmetrical shape of the holding element described has the following advantage: The holding element is designed to be stronger on a first side than on a second side in accordance with the loads occurring (standard and in the event of a crash), since the forces occurring in the standard case or in the event of a crash, especially in the area due to the direction of the force acting on the webbing belt element are introduced on the first side.

In order to minimise the risk of the seat occupant suffering injuries, for example bruising, when operating the restraint system, it is also advantageous if two exterior surfaces of the holding element each have an elevation which is guided in a complementary groove of a frame element surrounding the holding element. Thus it is ensured that the holding element is guided so as to be vertically displaceable within the frame element. The frame element preferably forms the upper and lower limits of the adjustment movement. The first and the second maximum positions of the holding element are preferably formed by means of the frame element.

The restraint system thus appears optically closed. Due to the closed design and also due to the fact that the mechanics behind the support element have no elements with a high risk of injury, the pinch/shear area near the belt deflection, which is known from the prior art as critical, is largely defused.

In order to further improve the pretensioning of the guide belt element, it is provided according to a preferred embodiment that a first tensioning roller for the guide belt element is arranged in a first tensioning section of the guideway between the adjustment section and the friction section and a second tensioning roller for the guide belt element is arranged in a second tensioning section of the guideway between the adjustment section and the friction section, the first tensioning section and the second tensioning section being arranged opposite one another.

The guideway preferably comprises the following sections along its circumference in this sequence: the first tensioning section, the friction section, the second tensioning section and the adjustment section (which is followed by the first tensioning section again due to the closed configuration of the guide belt element).

It can be advantageous if the guide belt element is configured as a flat belt with a rectangular cross-section, as described above. Possible variants provide that the guide belt element is designed as a V-belt or as a poly-V belt. Furthermore, it can be advantageous if the rollers are designed as pulleys with a surface complementary to the shape of the guide belt element.

In this case, a position of one or both tensioning rollers is preferably adjustable, so that, when the prestressing of the guide belt element decreases, said element can be tensioned again in a simple manner. The position of one or both tensioning rollers is preferably adjusted perpendicular to one of the directions of rotation of the guide belt element.

The present configuration, in particular the small deflection radius of the guide belt element, ensures a minimal installation space for the restraint system according to the invention.

BRIEF DESCRIPTION OF THE DRAWINGS

Further advantages, aims, and features of the present invention are explained with reference to the accompanying drawings and the following description, in which embodiments of the vehicle seat according to the invention are shown and described by way of example. In the drawings:

FIG. 4b shows an enlarged representation of the view of FIG. 4a;

DETAILED DESCRIPTION

Figure 2A:
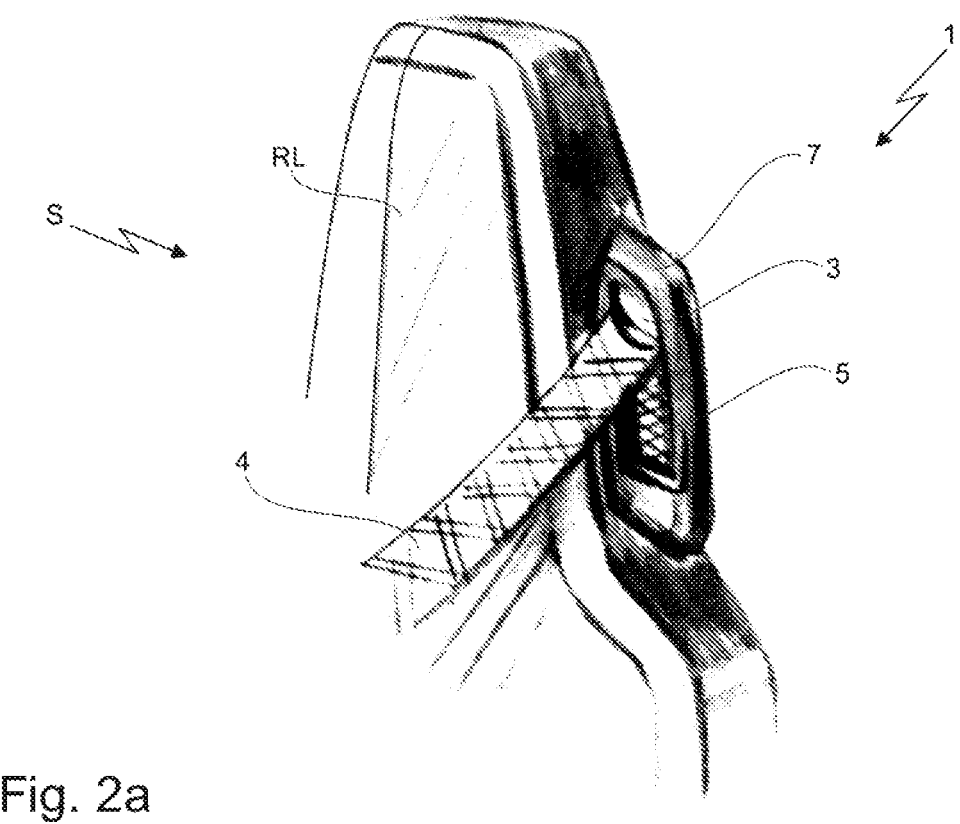
FIG. 2a shows a perspective view of a first embodiment of the restraint system according to the invention.
Figure 2B:
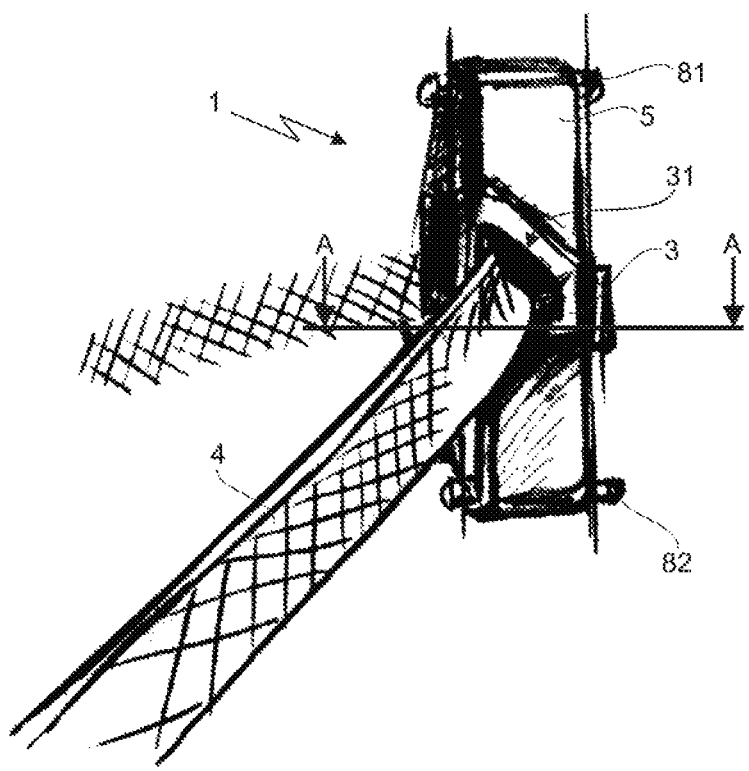
FIG. 2b shows a perspective view of the restraint system according to the invention, according to which parts of the restraint system are hidden.

It should be mentioned that parts have been omitted from the figures for better clarity. For example, FIG. 5b does not show the webbing belt element 4. FIGS. 2a and 2b show only parts of the restraint system 1 according to the invention.

Figure 1:
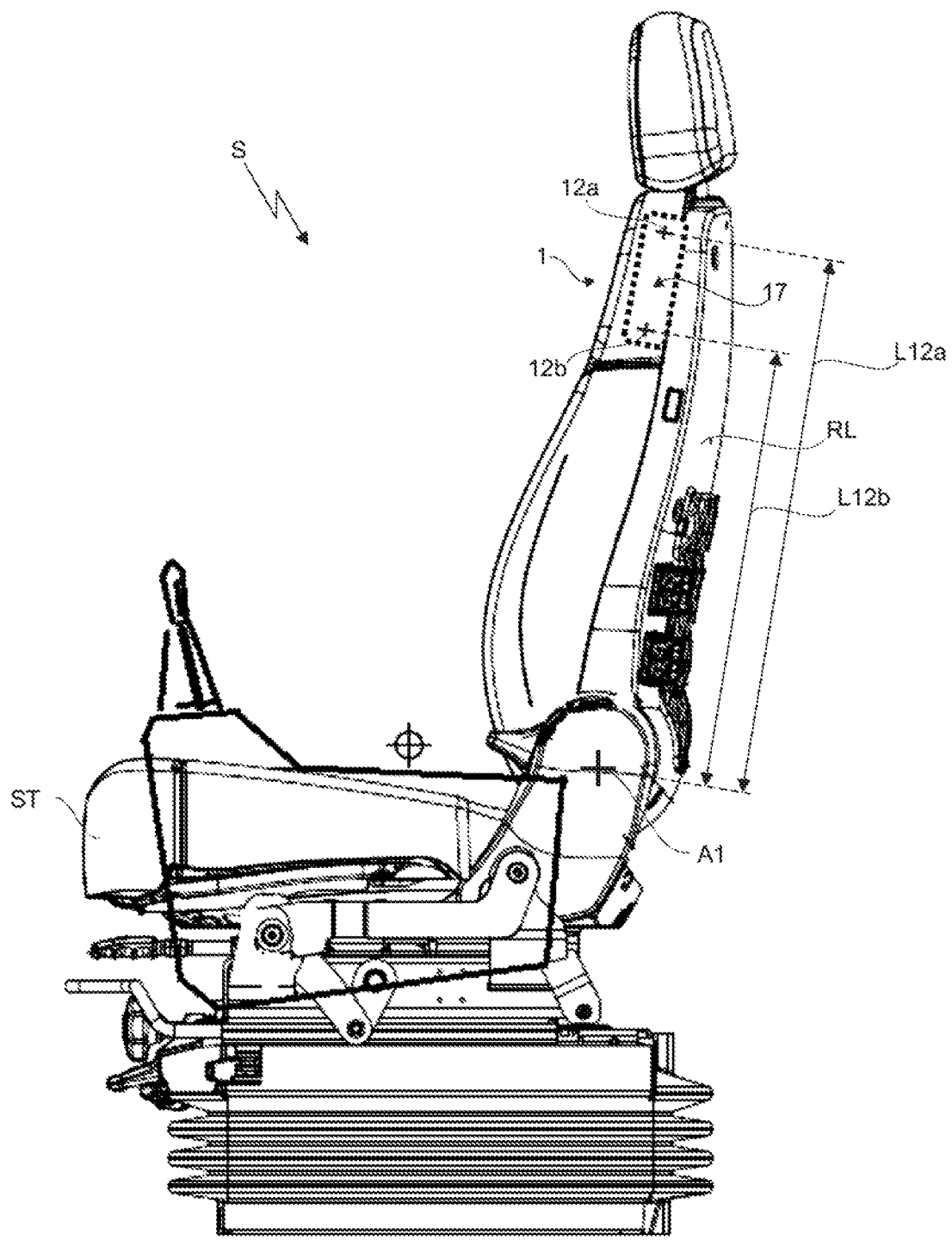
FIG. 1 shows a side view of a vehicle seat with a schematically marked example area, in which a frame element of a restraint system according to the invention can be arranged.
Figure 4A:
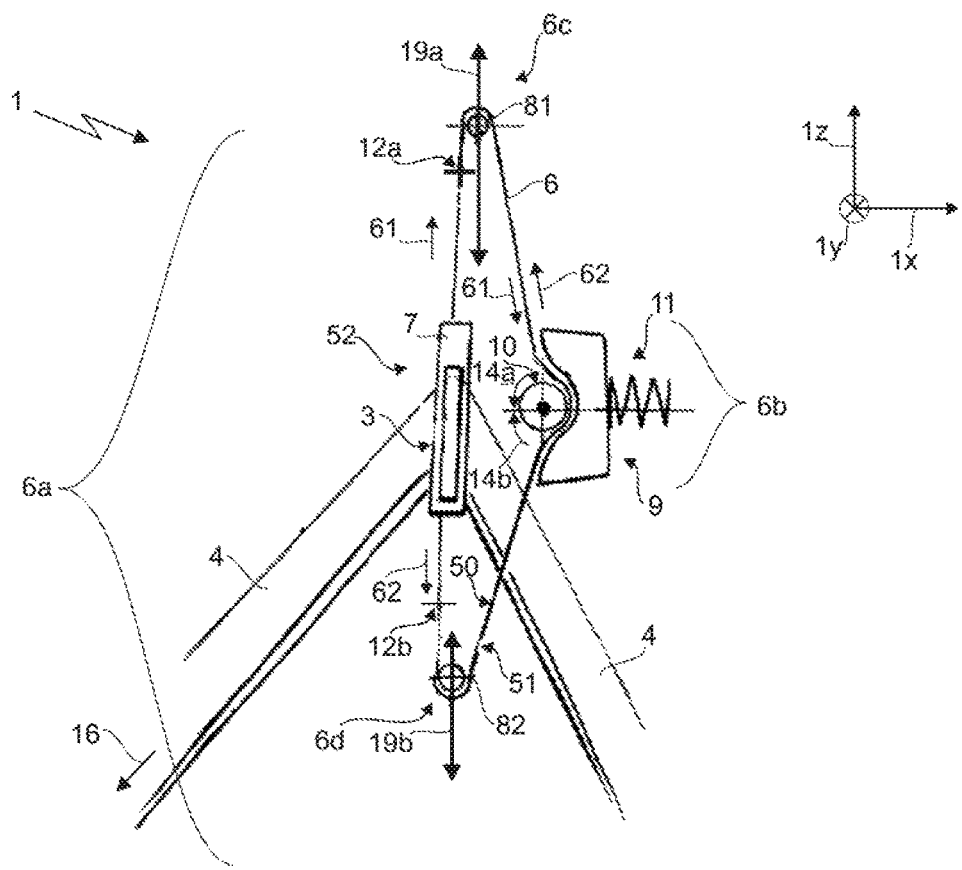
FIG. 4a shows a schematic representation of the restraint system according to the invention.

FIG. 4a shows a restraint system 1 for a vehicle seat S (see FIG. 1), comprising a webbing belt element 4 for restraining an occupant (not shown) of the vehicle seat S, further comprising a guide belt element 5 which is guided continuously on a guideway 6. The holding element 3 is securely connected to a first section 52 of the guide belt element 5, the webbing belt element 4 being passed through a cutout 31 (see FIG. 5a) of the holding element 3. According to the invention, it is provided that the guide belt element 5 is self-contained, whereby by means of a movement of the guide belt element 5 on the guideway 6 in a first direction of rotation 61, the holding element 3 is continuously adjustable within an adjustment section 6a of the guideway 6 from a second maximum position 12b to a first maximum position 12a.

Figure 5A:
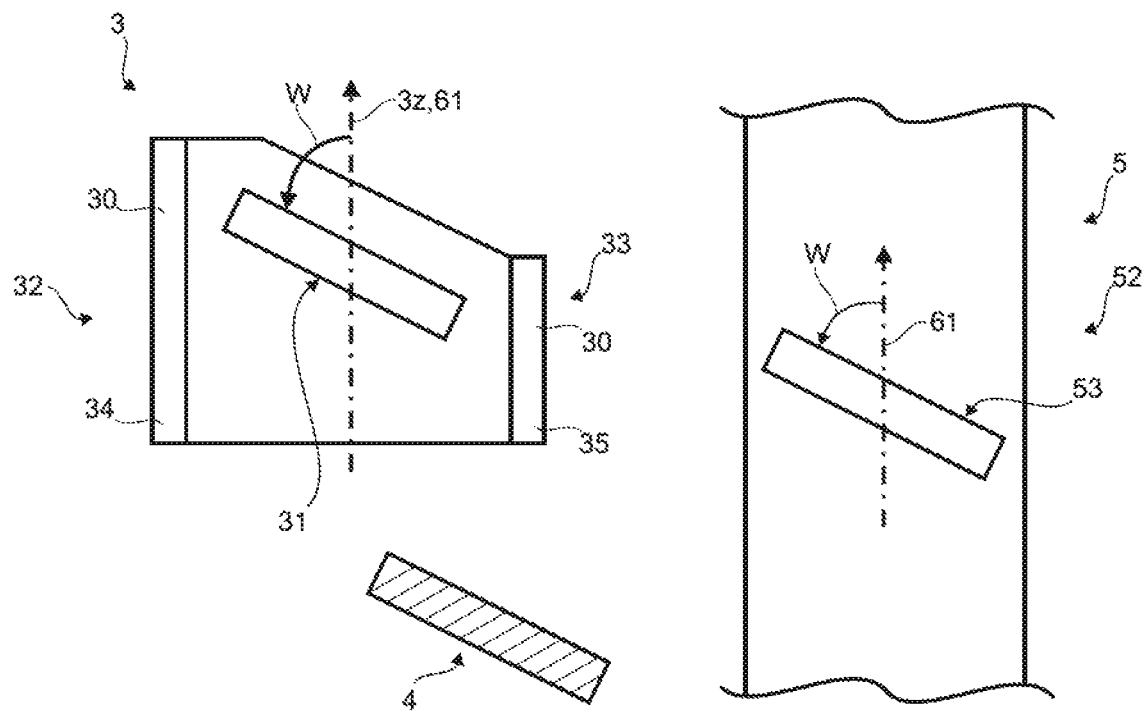
FIG. 5a shows representations of the holding element, the guide belt element and the webbing belt element.
Figure 5B:
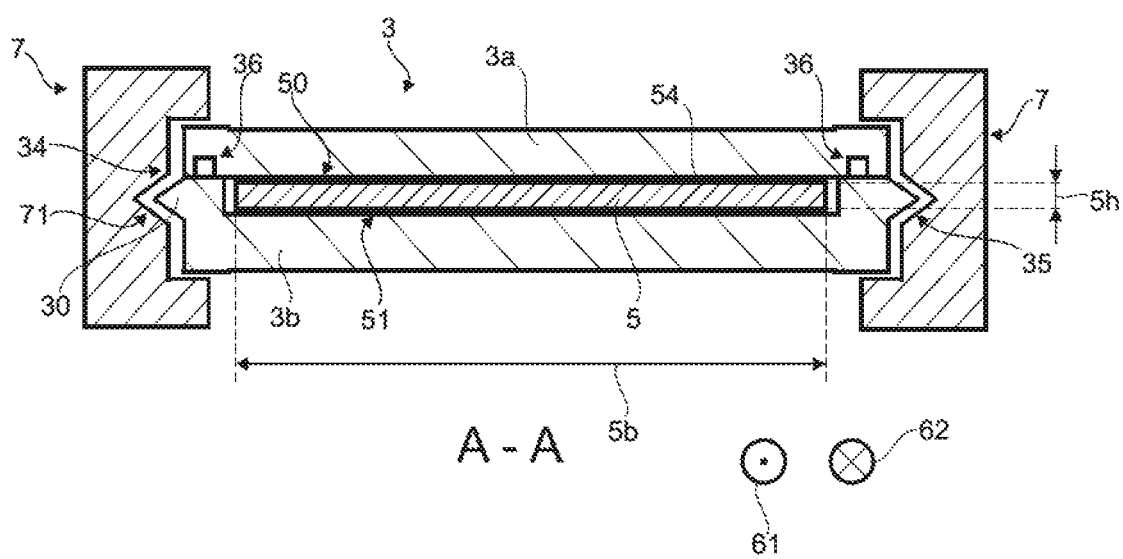
FIG. 5b shows a cross-section along the line A-A in FIG. 2b.

As shown in FIG. 5b, the guide belt element 5 has a cross-section which is perpendicular to the first direction of rotation 61 and in the present case is in the form of a rectangle. In the present case, a width 5b of the guide belt element 5 is substantially greater than a height 5h of the guide belt element 5. A constricted state of the guide band element 5 is shown (as will be explained in more detail below); in the present case, the relations mentioned between the dimensions of the cross-section of the guide belt element also apply to the non-constricted cross-section of the guide belt element.

Figure 3A:
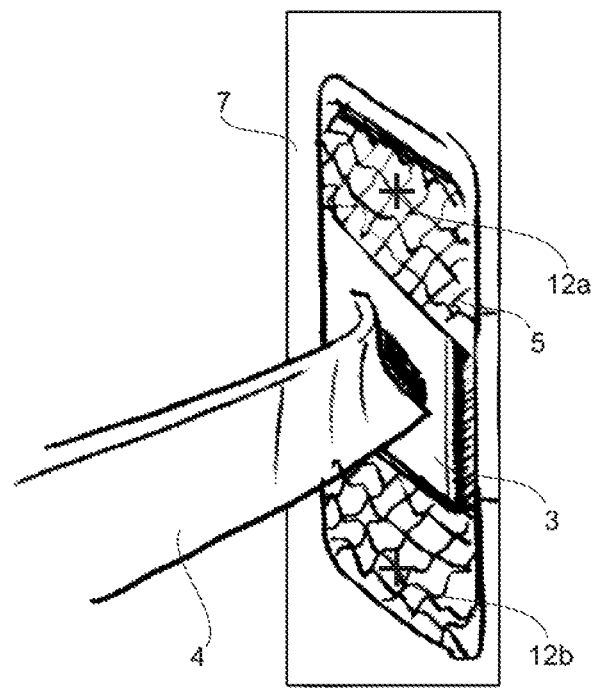
FIG. 3a shows a perspective view of the restraint system according to the invention, according to which the holding element is arranged in a central position.
Figure 3B:
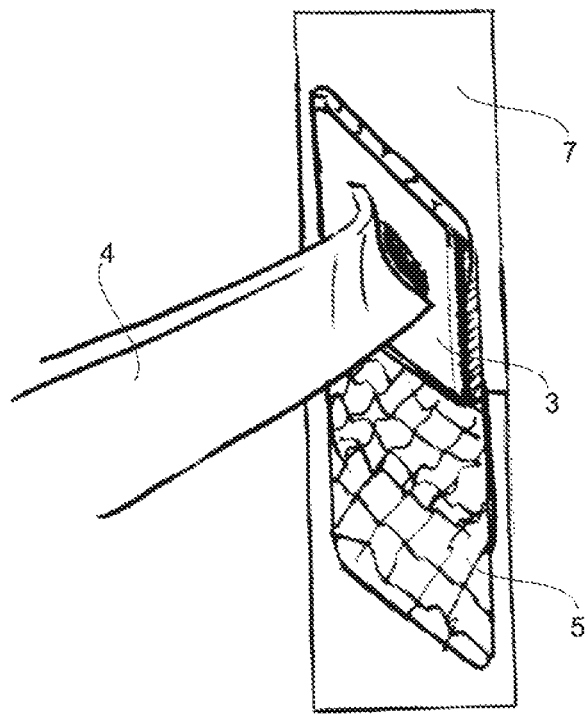
FIG. 3b shows the view according to FIG. 3a, wherein the holding element is arranged in a first maximum position.

In the present case, all conceivable positions of the holding element 3, which it assumes with respect to a course of the guideway 6, are arranged within the adjustment section 6a. According to FIG. 3a, the holding element 3 is arranged in a position approximately midway between the first maximum position 12a and the second maximum position 12b. According to FIG. 3b, the holding element 3 is arranged in the first maximum position 12a.

The holding element 3 takes on the function of the support element of the webbing belt element 4. The webbing belt element 4 is guided within the cutout 31 of the holding element 3, but is otherwise designed to be movable with respect to the latter.

In the present case, the holding element 3 experiences only a translational movement and no rotational movement during an adjustment as described above. In the present case, the direction of rotation 61 and the guide belt element 5 are designed to run in a straight line within the adjustment region 6a.

Due to the closed shape of the guide belt element, it has two possible directions of rotation 61, 62. In the present case, the two directions of rotation 61, 62 are opposite to each other. The second direction of rotation 62 in relation to a course of the guideway 6 preferably corresponds to the direction from the first 12a to the second maximum position 12b. Furthermore, the first direction of rotation 61 corresponds with respect to a course of the guideway 6 in the present case to the direction from the second maximum position 12b to the first maximum position 12a.

In the present case, the guide belt element 5 is a polyester belt and has a low degree of stretchability. The holding element 3 is securely mounted on the guide belt element 5 (see FIG. 5b) and in the present case is connected to both sides 50, 51 of the guide belt element 5 by means of an adhesive connection 54. In addition, the holding element 3 comprises two parts 3a, 3b, of which one part 3a is arranged on the first side 50 of the guide belt element 5 and the other part 3b is arranged on a second side 51 of the guide belt element 5. In the present case, these two parts 3a, 3b are connected to one another by means of a clip connection 36.

In the present case, the guide belt element 5 forms a constriction in its cross-section in the first section 52 when the holding element 3 is mounted, since the guide belt element 5 in the present case is subjected to a force in the form of a surface pressure by means of the holding element 3.

In the present case, the webbing belt element 4 likewise has a rectangular cross-section (see FIG. 5a). The cutout 31 in the holding element 3 for the webbing belt element 4 is complementary here to the cross-section of the webbing belt element 4 and is rectangular.

FIG. 4a also shows that the guideway 6 forms a friction section 6b arranged separately from the adjustment section 6a. In the present case, a braking unit 9 for the guide belt element 5 is arranged in the friction section 6b. This braking unit comprises a friction wheel unit 10 arranged on the first side 50 of the guide belt element 5 and a brake shoe unit 11 which is arranged on a second side 51 of the guide belt element 5 and which can interact with the friction wheel unit 10.

In the present case, the friction wheel unit 10 forms a frictional contact with the first side 50 of the guide belt element 5. In the present case, the brake shoe unit 11 forms a frictional contact with the second side 51 of the guide belt element 5. In the present case, the friction wheel unit 10 and the brake shoe unit 11 lie opposite one another in relation to the direction of rotation 61.

It is also shown that the friction wheel unit 10 in the present case comprises a friction wheel element 13. In the present case, the outer surface 13b of the friction wheel element forms a friction surface with respect to the guide belt element 5. In the present case, a rotational movement of the friction wheel element 13 about a central axis 13a of the friction wheel element 13 is acted upon by force in a first direction 14a and forms a freewheel in a second direction 14b.

Figure 4B:
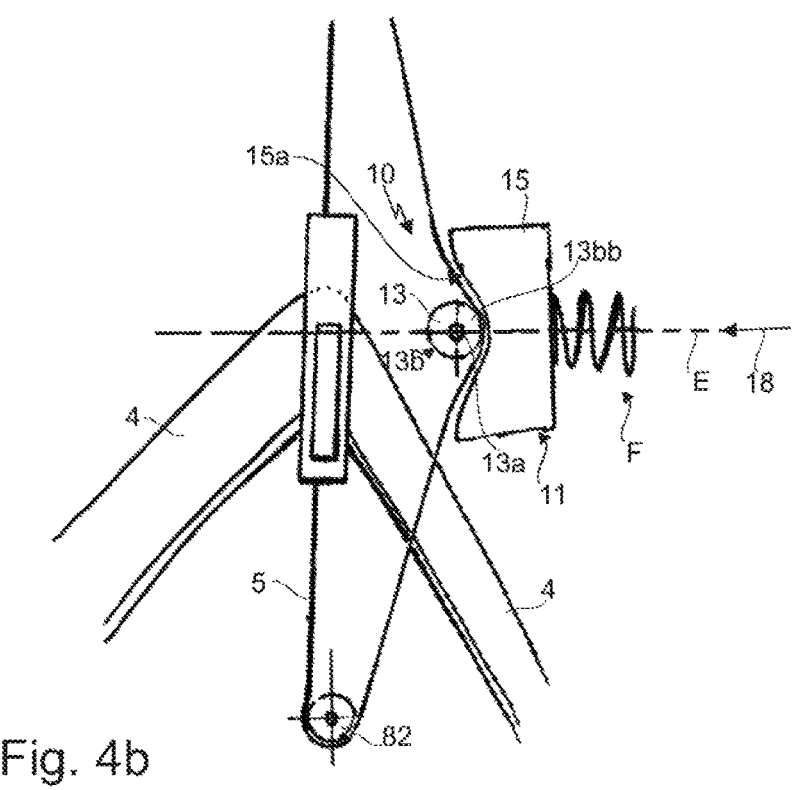

In the present case, the brake shoe unit 11 has exactly one mirror symmetry plane E1 (see FIG. 4b). In the present case, a central axis 13a of the friction wheel element 13 lies in this mirror symmetry plane E1.

According to FIG. 4a, it is shown that the first direction 14a of the friction wheel element 13 is aligned with the second direction of rotation 62 of the guideway 6. It is also shown that the second direction 14b of the friction wheel element 13 is aligned with the first direction of rotation 61 of the guideway 6.

In the present case, the first maximum position 12a is arranged above the second maximum position 12b with respect to a height direction 1z of the restraint system 1. According to FIG. 4a, the holding element 3 is arranged at a position between the first maximum position 12a and the second maximum position 12b. Gravity acts on the holding element 3 and attempts to move it towards the second maximum position 12b. This undesired movement is successfully prevented by the force applied to the guide belt element 5 by means of the friction wheel element 13 and the brake shoe unit 11. In the case of a desired adjustment of the holding element 3 in the direction of the second maximum position 12b, the friction surface of the friction wheel element 13 and the brake shoe unit 11 is designed such that the applied frictional force can be overcome manually. In the opposite direction, that is to say with a desired adjustment of the holding element 3 upwards, on the other hand, an almost force-free adjustment is possible.

In the event of a crash, strong forces act on the webbing belt element 4, for example in a direction 16 (see FIG. 4a) starting from the holding element 3 and directed away from the friction section 6b of the restraint system 1. This immediately overcomes the applied frictional force. The position of the holding element 3 is changed until the second maximum position 12b is reached. According to FIG. 1, the vehicle seat S is designed so that the backrest RL is designed to be pivotable relative to the seat surface of the seat part ST and so that the two maximum positions 12a, 12b of the holding element 3 are arranged on an upper region 17 of the backrest RL. The lever arm, which the backrest RL represents with respect to a rotation about an axis A1 between the backrest RL and the seat surface or seat part ST, is therefore shortened in the event of a crash, and the torque introduced into the seat axis A1 is reduced. The illustration shows the maximum length L12a of the lever arm when the holding element 3 is arranged in its first maximum position 12a, and the minimum length 12b of the lever arm when the holding element 3 is arranged in its second maximum position 12b.

In the present case, it is provided that the brake shoe unit 11 comprises a brake shoe element 15. In the present case, this forms a cutout 15a designed to be complementary to a section 13bb of the outer surface 13b of the friction wheel element 13. In the present case, this cutout 15a is curved at least in some sections.

It is thus ensured in the present case that at least part of the outer surface 13b of the friction wheel element 13 and at least part of a surface of the cutout 15a of the brake shoe element 15 form a section of the guideway 6 for the guide belt element 5.

In the present case, the brake shoe element 15 is spring-loaded with respect to a direction 18 (see FIG. 4b), which is arranged parallel to the normal vector of the two sides 50, 51 of the guide belt element 5 and is oriented towards the central axis 13a of the friction wheel element 13.

According to FIG. 5a, the webbing belt element 4 is shown in a cross-section, and the holding element 3 and the guide belt element 5 are each shown in a non-assembled state of the restraint system 1; thus there are individual views of the elements 3, 4 and 5. In the fully assembled state (see, for example, FIG. 4a) of the restraint system 1, it is ensured in the present case that the webbing belt element 4 is guided through a cutout 53 (see FIG. 5a) in the first section 52 of the guide belt element 5. In the present case, the cutout 53 of the guide belt element 5 and the cutout 31 of the holding element 3, through which the guide belt element 5 is also guided, are arranged overlapping one another. Furthermore, in the present case, both cutouts 31, 53 are of the same size and congruent to one another. In the fully assembled state of the restraint system 1, the degree of overlap between the two cutouts 31, 53 is 100% in the present case.

According to FIG. 5a, it is also illustrated that a longitudinal extension of the cutout 53 of the guide belt element 5 and a longitudinal extension of the cutout 31 of the holding element 3 are arranged at an acute angle to the first direction of rotation 61.

It is also shown that an extent of the holding element 3 in a direction 3z parallel to the first direction of rotation 61 is greater on a first side 32 than on a second side 33.

In addition, two exterior surfaces 34, 35 of the holding element 3 each have an elevation 30, which is guided in a complementary groove 71 of a frame element 7 surrounding the holding element 3. This ensures that the holding element 3 is guided vertically displaceably within the frame element 7. In the present case, the frame element 7 forms the upper and lower limits of the adjustment movement. In addition, the first maximum position 12a and the second maximum position 12b of the holding element 3 are formed by means of the frame element 3 (see here FIG. 2a).

FIG. 4a shows that a first tensioning roller 81 for the guide belt element 5 is arranged in a first tensioning section 6c of the guideway 6 between the adjustment section 6a and the friction section 6b, and a second tensioning roller 82 for the guide belt element 5 is arranged in a second tensioning section 6d of the guideway 6 between the adjustment section 6a and the friction section 6b, the first tensioning section 6c and the second tensioning section 6d being arranged opposite one another.

In the present case, the guideway 6 comprises the following sections along its circumference in this sequence: the first tensioning section 6c, the friction section 6a, the second tensioning section 6d and the adjustment section 6a, which is followed by the first tensioning section 6c due to the closed configuration of the guide belt element 5. This sequence is illustrated in FIG. 4a in a clockwise direction in a direction of the guideway 6.

In this case, a position of both tensioning rollers 81, 82 is adjustable in the present case. In the present case, the position of both tensioning rollers is adjusted perpendicular to one of the directions of rotation 61, 62 of the guideway 6 and is illustrated in FIG. 4a by means of the directions 19a, 19b marked with double arrows.

It is understood that the above embodiment is merely an initial configuration of the restraint system 1 according to the invention. In this respect, the configuration of the invention is not limited to this embodiment.

All the features disclosed in the application documents are claimed as being essential to the invention, provided that, individually or in combination, they are novel over the prior art.

LIST OF REFERENCE SIGNS 1 restraint system
3 holding element
3a, 3b part
3z, 16, 18, 19a, 19b direction
4 webbing belt element
5 guide belt element
5b width
5h height
6 guideway
6a adjustment section
6b friction section
6c, 6d tensioning section
7 frame element
9 braking unit
10 friction wheel unit
11 brake shoe unit
12a, 12b maximum position
13 friction wheel element
13a central axis
13b outer surface
13bb, 52 section
14a, 14b direction
15 brake shoe element
15a, 31, 53 cutout
17 region
30 elevation
32, 33, 50, 51 side
34, 35 exterior surface
36, 54 connection
61, 62 direction of rotation
71 groove
81, 82 tensioning roller
A1 axis
E mirror symmetry plane
F spring element
L12a, L12b length
RL backrest
S vehicle seat
ST seat part
W angle

The invention claimed is:

1. A restraint system for a vehicle seat, comprising:
a webbing belt element for restraining an occupant of the vehicle seat, further comprising a guide belt element which is guided continuously on a guideway, a holding element being positionally secure connected to a first section of the guide belt element,
wherein the webbing belt element is guided passing through a cutout in the holding element,
wherein by means of a movement of the guide belt element, which is self-contained, on the guideway in a first direction of rotation, the holding element is continuously adjustable within an adjustment section of the guideway from a second maximum position to a first maximum position,
wherein the guideway forms a friction section arranged separately from the adjustment section, and
wherein in the friction section a braking unit for the guide belt element is arranged which comprises a friction wheel unit arranged on a first side of the guide belt element and a brake shoe unit which is arranged on a second side of the guide belt element and which can interact with the friction wheel unit.

2. The restraint system according to claim 1, wherein the friction wheel unit comprises a friction wheel element, an outer surface of which forms a friction surface with respect to the guide belt element, wherein a rotational movement of the friction wheel element around a central axis of the friction wheel element is acted upon by a force in a first direction and forms a freewheel in a second direction.

3. The restraint system according to claim 2, wherein the brake shoe unit comprises a brake shoe element which forms a cutout designed to be complementary to a section of the outer surface of the friction wheel element.

4. The restraint system according to claim 1, wherein at least one of the webbing belt element is guided passing through a cutout in the first section of the guide belt element, and the cutout of the guide belt element and the cutout of the holding element overlap one another.

5. The restraint system according to claim 4, wherein at least one of a longitudinal extension of the cutout of the guide belt element and a longitudinal extension of the cutout of the holding element are arranged at an acute angle relative to the first direction of rotation, and wherein an extent of the holding element in a direction parallel to the first direction of rotation is greater on a first side than on a second side.

6. The restraint system according to claim 4, wherein at least one of a longitudinal extension of the cutout of the guide belt element and a longitudinal extension of the cutout of the holding element are arranged at an acute angle relative to the first direction of rotation.

7. The restraint system according to claim 4, wherein an extent of the holding element in a direction parallel to the first direction of rotation is greater on a first side than on a second side.

8. The restraint system according to claim 1, wherein two exterior surfaces of the holding element each have an elevation, each of which is guided in a complementary groove of a frame element surrounding the holding element.

9. The restraint system according to claim 1, wherein a first tensioning roller for the guide belt element is arranged in a first tensioning section of the guideway between the adjustment section and the friction section, and a second tensioning roller for the guide belt element is arranged in a second tensioning section of the guideway between the adjustment section and the friction section, the first tensioning section and the second tensioning section being arranged opposite one another.

10. A restraint system for a vehicle seat, comprising:
a webbing belt element for restraining an occupant of the vehicle seat, further comprising a guide belt element which is guided continuously on a guideway, a holding element being positionally secure connected to a first section of the guide belt element,
wherein the webbing belt element is guided passing through a cutout in the holding element,
wherein by means of a movement of the guide belt element, which is self-contained, on the guide-way in a first direction of rotation, the holding element is continuously adjustable within an adjustment section of the guideway from a second maximum position to a first maximum position,
wherein at least one of: a) the webbing belt element is guided passing through a cutout in the first section of the guide belt element; and b) the cutout of the guide belt element and the cutout of the holding element are arranged to overlap one another.

11. The restraint system according to claim 10, wherein at least one of a longitudinal extension of the cutout of the guide belt element and a longitudinal extension of the cutout of the holding element are arranged at an acute angle relative to the first direction of rotation, and wherein an extent of the holding element in a direction parallel to the first direction of rotation is greater on a first side than on a second side.

12. The restraint system according to claim 10, wherein two exterior surfaces of the holding element each have an elevation, each of which is guided in a complementary groove of a frame element surrounding the holding element.

13. The restraint system according to claim 10, wherein an extent of the holding element in a direction parallel to the first direction of rotation is greater on a first side than on a second side.

14. The restraint system according to claim 10, wherein at least one of a longitudinal extension of the cutout of the guide belt element or a longitudinal extension of the cutout of the holding element are arranged at an acute angle relative to the first direction of rotation.

15. A restraint system for a vehicle seat, comprising:
a webbing belt element for restraining an occupant of the vehicle seat, further comprising a guide belt element which is guided continuously on a guideway, a holding element being positionally secure connected to a first section of the guide belt element,
wherein the webbing belt element is guided passing through a cutout in the holding element,
wherein by means of a movement of the guide belt element, which is self-contained, on the guide-way in a first direction of rotation, the holding element is continuously adjustable within an adjustment section of the guideway from a second maximum position to a first maximum position,
wherein two exterior surfaces of the holding element each have an elevation, each of which is guided in a complementary groove of a frame element surrounding the holding element.

* * * * *